United States Patent [19]

Wawra et al.

[11] 3,783,396
[45] Jan. 1, 1974

[54] SIGNAL TRANSMITTAL CONTROL CIRCUIT

[75] Inventors: Carl Martin Wawra, Bensheim-Auerbach; Ivan Chudey, Ober-Ramstadt, both of Germany

[73] Assignee: Carl Schenck Maschinenfabrik GmbH, Darmstaat, Germany

[22] Filed: Mar. 8, 1972

[21] Appl. No.: 232,723

[30] Foreign Application Priority Data
Feb. 21, 1972 Germany............... P 22 07 993.2

[52] U.S. Cl............. 328/151, 307/235 R, 307/241, 328/99, 328/168
[51] Int. Cl............. H03k 5/18, H03b 3/02
[58] Field of Search................. 307/202, 204, 219, 307/235 R, 235 A, 241, 242; 328/70, 96, 99, 100, 115, 116, 142, 143, 145, 147, 149, 151, 162, 163, 168, 172; 340/146.1 A, 146.1 AX, 248 A, 248 B, 248 C

[56] References Cited
UNITED STATES PATENTS
3,358,157  12/1967  Shearme.................. 307/242 X
3,204,118  8/1965  Rotier...................... 307/235 X
3,420,993  1/1969  Chamberlain et al. ......... 328/147 X
3,435,252  3/1969  Eubanks.................. 328/172 X
3,480,765  11/1969  Rouxel et al................ 307/235 X
3,502,992  3/1970  Cooperman............... 307/235 X
3,508,159  4/1970  Marpe..................... 328/96 X
3,513,353  5/1970  Lansch.................... 307/235 X
3,612,975  10/1971  Keefe..................... 307/235 R
3,638,037  1/1972  McMurtrie................ 307/235 A Primary Examiner—John W. Huckert
Assistant Examiner—L. N. Anagnos
Attorney—Wolfgang G. Fasse

[57] ABSTRACT

The present circuit arrangement controls the transmitting of signals, for example, rated control signals, in accordance with predetermined transmittal requirements as represented by the signals to be transmitted, for example, by their amplitudes. For this purpose a signal path is provided for each signal between respective input and output terminals. Switching means in each signal path controlled by signal responsive control means are provided to block or close the respective signal path in accordance with the instantaneous transmittal requirement.

10 Claims, 2 Drawing Figures

3,783,396

SIGNAL TRANSMITTAL CONTROL CIRCUIT

BACKGROUND OF THE INVENTION

The present invention relates to a signal transmittal control circuit which is especially useful for transmitting rated signals in connection with the control of material testing apparatus. Such apparatus usually comprises an automatic programming device and regulator means responsive to the programming device. The regulating means may, for instance, control a first load applying means which produces, for example by means of a hydraulic piston cylinder arrangement, a mean load and a further load applying device which produces again, for example by means of a further piston cylinder arrangement, an oscillating amplitude. The automatic programming device supplies to the regulating means the rated control values and the present invention pertains especially to the circuit arrangement for transmitting such rated control values from the automatic programming device to the regulator means.

The automatic programming device supplies the rated control signals in such a manner that sudden signal changes occur. Generally, the rated signal values are provided as upper and lower load limits. Therefore, it is necessary to first transform these rated signal values for the mean loads and for the oscillating amplitude before supplying these signals to the control means of the material testing apparatus. Even where a load change does not involve any change in the load limit values, nevertheless, the rated signal values for the mean load and for the oscillating amplitude change as a result of such load change. Due to the different response characteristics of the load devices when the latter are regulated or adjusted to the predetermined load limits, it is possible that under certain circumstances the unchanged load limit may be substantially exceeded whereby false test results are produced. For example, uncontrolled conditions may be produced due to the fact that the hydraulic means of the testing apparatus, because of their limited capacity, cannot always follow the signal values electrically supplied by the automatic programming device. Thus, the oil pressure may sink whereby the mentioned uncontrolled conditions would be produced. Such conditions must be avoided under any circumstances.

OBJECTS OF THE INVENTION

In view of the foregoing, it is the aim of the invention to achieve the following objects singly or in combination:

to overcome the above outlined drawbacks, more specifically, to avoid exceeding the predetermined load limits;

to prevent the occurence of uncontrolled conditions in a testing sequence, for example, due to a pressure decrease in the hydraulic means when the latter are regulated in a hydraulic testing apparatus;

to provide a signal transmitting circuit which has a plurality of signal paths between respective input and output terminals whereby the signal passage or the interrution of a signal path is controlled in accordance with predetermined signal values to be passed; and to provide a signal transmitting control circuit which by means of electronic switching elements and logic circuit control means will select and predetermine the safest signal path for the passage of the new rated signals in response to all possible and actually occuring changes of the limit signal values.

SUMMARY OF THE INVENTION

According to the invention there is provided a signal transmitting control circuit having a plurality of signal paths with input and output terminals. Mechanical or electrical switching means are arranged in said signal paths, for example, between an automatic programming device and a regulator for a hydraulic testing apparatus. The switching means in the signal path are controlled by circuit means such as trigger stages, AND-gates or the like for blocking or opening any particular signal path of new or further rated signals in accordance with certain circuit conditions which are determined by the change in the switching condition of said control means in response to the simultaneous change or variation of, for example, two rated values. The change in the switching condition or status of the control means is such that the new rated signal value for the mean load is blocked or prevented from passing through its signal path in response to a decrease in the oscillating amplitude representing signal value and further in such a manner that the new rated signal value for the oscillating amplitude is blocked in response to an increase in said oscillating amplitude. The blocking or interruption of the passage of the new rated signal values may be accomplished by interrupting the respective transmitting signal path or by applying ground potential to an amplifier arranged in the circuit means of the signal path.

According to a particular embodiment of the invention there is provided a differential amplifier comprising two inputs. The rated signal value representing the oscillating amplitude is supplied to one input of the differential amplifier while the new or next successive rated signal value representing the next oscillating amplitude is applied to the other input of the differential amplifier which produces at its output a positive or a negative difference voltage whereby the negative difference voltage actuates a first trigger circuit the output of which is connected to actuate a switching means which interrupts the signal path for the new rated value representing the mean load. Another trigger circuit also connected to the output of said differential amplifier is triggered by a positive output voltage and is connected with its output to one input of an AND-gate the other input of which is connected to an output of a third trigger circuit or stage which is actuated in response to variations of the rated signal values representing the mean load. The output of said AND-gate is connected to a switch means which blocks or interrupts the passage of the new rated signal value representing the oscillating amplitude.

BRIEF FIGURE DESCRIPTION

In order that the invention may be clearly understood, it will now be described, by way of example, with reference to the accompanying drawings, wherein:

FIG. 1 is a schematic circuit diagram of a signal transmitting control circuit according to the invention; and FIG. 2 illustrates a detail of FIG. 1.

DETAILED DESCRIPTION OF EXAMPLE EMBODIMENTS

Figure 1:
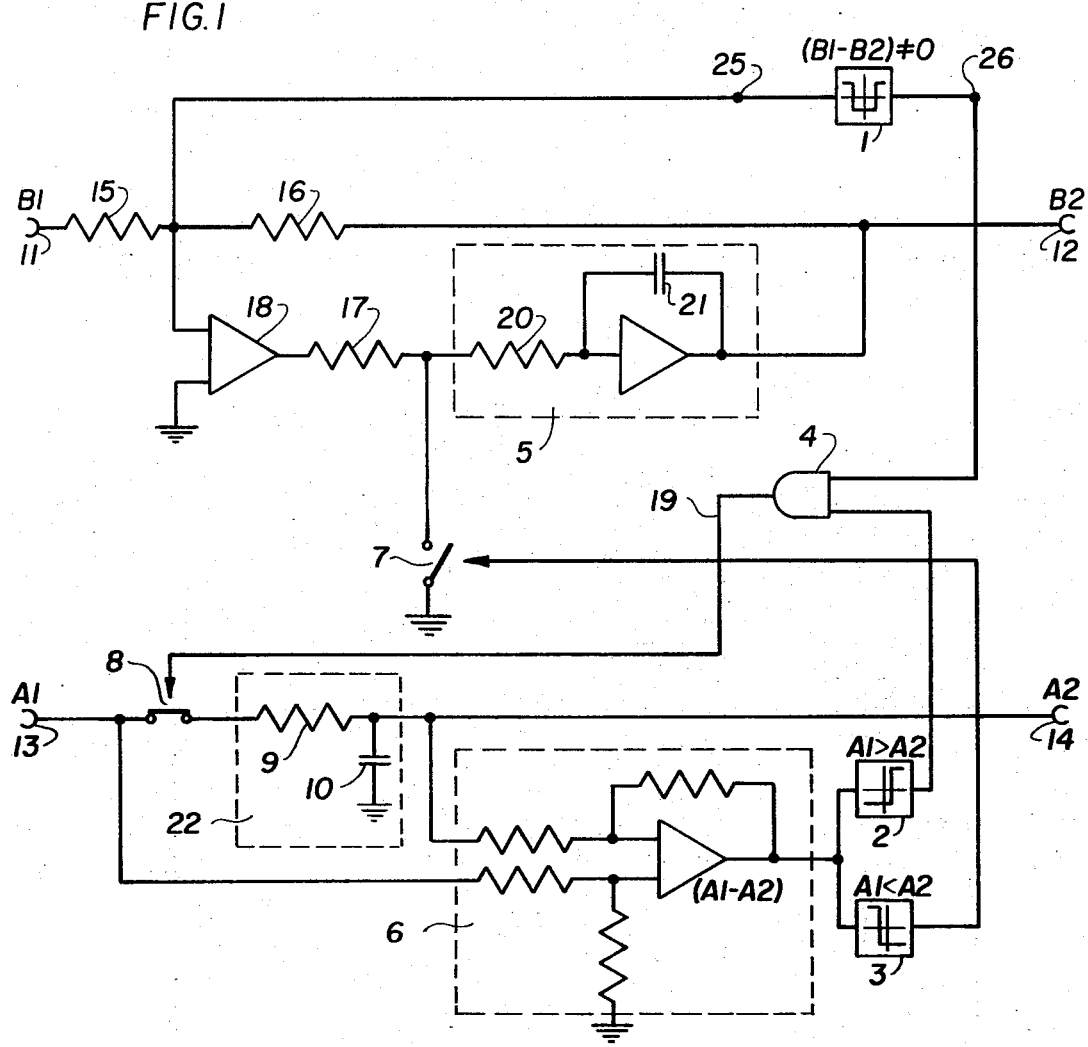

The block circuit diagram of FIG. 1 comprises, for example two signal paths. The first signal path extends between the input terminal 13 and the output terminal 14. The second signal path extends between the second input terminal 11 and the second output terminal 12. The input terminals may, for example, be connected to an automatic programming device for material testing apparatus. The output terminals may be connected to regulating or control means including signal storage means for the material testing apparatus.

The first input signal A1 is applied to the first input terminal 13. The second input signal B1 is applied to the second input terminal 11. The transmitted signal A2 appears at output terminal 14 and the second transmitted signal B2 appears at output terminal 12. Let it be assumed that the rated signal values designated with the letter A represent the oscillating amplitude whereas the rated signal values designated by the letter B represent the mean load. The index 1 designates the input rated values or the signal values to be transmitted and the index 2 designates the output rated signal values or the signal values which have been transmitted.

The first input terminal 13 is connected to the first output terminal 14 by means of a switch 8 connected in series with signal function means 22. The switch 8 may be a relay switch or any suitable electronic switch. The function means 22 may, for example, comprise an RC combination including a resistor 9 connected in series between the switch 8 and the terminal 14, and a capacitor 10 connected at one end thereof between the resistor 9 and the terminal 14 and with its other end to the ground. When the rated input value A1 changes, the output signal value A2 will change logarithmically as a function of time. This variation characteristic is determined by the charging or discharging characteristic of the capacitor 10. By changing the value of the resistor 9 and/or the capacity of the capacitor 10, it is possible in a manner known per se to determine the time constant of the charging characteristic and to vary it in accordance with the desired conditions.

Instead of the function means 22 comprising an RC combination, it is possible to employ other function means having the desired wave form characteristic, for example, an operational amplifier having different circuit configurations in order to obtain any desired transition function. A linear transition function with respect to time may, for example, be obtained by means of an integrator circuit 5 to be more fully described below.

The control means for the first signal transmitting path comprise a differential amplifier 6, one input of which is connected to the input terminal 13 and the other input of which is connected to the output terminal 14. These connections may be accomplished through suitable resistors. The differential amplifier 6 produces at its output the difference between the input signal A1 and the output signal A2 of the two rated signal values for the oscillating amplitude. The control means further comprise a first trigger stage 3 and a second trigger stage 2 connected with their inputs to the output of the differential amplifier 6. The first trigger stage 3 is actuated by a negative output value whereas the second trigger stage 2 is actuated by a positive output value. Thus, the trigger stage 2 becomes conductive in response to a positive output voltage that is when A1 is larger than A2. Similarly the trigger stage 3 becomes conductive when a negative output voltage appears at the output of the differential amplifier 6, that is, when A1 is smaller than A2.

The output of the trigger circuit 2 is connected to the input of an AND-gate 4 whereas the output of the trigger circuit 3 is connected to a switch means 7 which again may be a relay switch or any suitable electronic switch. The switch means 7 is closed when the input signal value A1 of the oscillating amplitude is smaller than the output value A2. The switch 8 will be opened in response to an output signal appearing at the output of the AND-gate 4. In other words, an output at the AND-gate 4 interrupts the signal path between the terminals 13 and 14. As a result, the output value A2 is then maintained constant by a signal storage device connected to the output terminal 14 and to the regulating means for the material testing apparatus. These elements are not shown since they are not part of the invention. However, in this condition of the circuit the oscillating amplitude will also be maintained constant.

The input terminal 11 for the input rated signal value B1 is connected through two resistors 15 and 16 arranged in series with each other to the output terminal 12 at which the rated output signal value B2 appears. A third trigger circuit 1 is connected with its input 25 to the junction between the resistors 15 and 16 and with its output 26 to the other input of the AND-gate 4. The third trigger circuit 1 becomes conductive when the input signal value B1 and the output signal value B2 are not equal to each other.

If both inputs of the AND-gate 4 are supplied with a voltage from the respective trigger circuits 1 and 2, a signal appears at the output conductor 19 of the AND-gate 4 whereby the switch 8 is actuated. Further, an amplifier 18 is connected with its input to the junction between the resistors 15 and 16. The amplifier 18 is connected with its output through a resistor 17 to a function means 5, for example, comprising an integrating circuit including an amplifier connected in parallel to a capacitor 21 and having its input connected through a resistor 20 to the resistor 17 and thus to the output of the amplifier 18. The integrating circuit 5 integrates the voltage applied to its input so that its output voltage rises or falls linearly with respect to time depending upon whether the input voltage of the integrating circuit 5 is positive or negative. The integrating constant may be varied by changing the resistance of the resistor 20 and/or the capacitance of the capacitor 21. If the switch 7 is closed, the input of the integrating circuit 5 is connected to ground or to zero potential whereby its output voltage and thus the output rated signal value B2 remains constant.

Instead of the integrating circuit 5 which has a linear time characteristic, in other words which produces a voltage which changes linearly with respect to time, it is possible to use other function means for example circuit elements comprising an RC combination or a computing amplifier having a different circuit configuration than the integrating circuit 5 in order to achieve the desired transition function for the particular purpose. Such wave form characteristic producing circuits or function means are known in the art.

The operation of the present circuit arrangement will now be described by way of several examples.

EXAMPLE 1

Let it be assumed that the input signal A1 is larger than the output signal A2 and that the input signal B1 is larger than the output signal B2. Thus, at the output of the differential amplifier 6 a positive voltage is produced which actuates the trigger circuit 2 whereby a positive voltage is applied to one input of the AND-gate 4. Simultaneously, a voltage is supplied to the other input of the AND-gate 4 through the trigger circuit 1 because B1 differs from B2. As a result, the switch 8 receives a signal through connecting lead 19 whereby the switch 8 is open and the output value A2 representing the oscillating amplitude is thereby maintained constant. The input rated signal value B1 is applied through the amplifier 18 to the input of the integrating circuit 5. The output voltage of the integrating circuit 5 rises linearly as a function of time and depending upon the polarity of the input signal to the integrator 5. Such rise continues until the output signal B2 becomes equal to B1. When this occurs, the trigger circuit 1 returns into its initial rest position whereby the signal applied to one input of the AND-gate 4 and thus also to the connection line 19 is switched off. Thus, the switch 8 is closed. Depending upon the dimensions of the resistor 9 and the capacitor 10 the output signal A2 assumes the value of the new input signal A1. The rise follows a logarithmic characteristic.

In the foregoing example in which both signal values increase, the circuit operates in such a manner that first the mean load is adjusted to the desired value and thereafter the oscillating amplitude is adjusted to its respective value.

EXAMPLE 2

It is assumed that the input signal A1 is larger than the output signal A2 and that the input signal B1 is smaller than the output signal B2. As in example 1 described, a positive signal or voltage occurs at the output of the differential amplifier 6 whereby again the trigger circuit 2 is actuated and the respective voltage is applied to one input of the AND-gate 4. Further, since B1 differs from B2, the trigger circuit 1 is also actuated and supplies a voltage to the other input of the AND-gate 4 whereby the switch 8 is opened via the conductor 19. The output voltage B2 is reduced to the value of the input voltage B1 by means of the integrating circuit 5 as described in Example 1. When the values of the signals B1 and B2 become equal, the switch 8 is again closed through the trigger circuit 1 and through the AND-gate 4 whereby the output value A2 may rise to the input value A1.

Also in this example the mean load is first adjusted to the new value and thereafter the oscillating amplitude is adjusted to its new value.

EXAMPLE 3

It is assumed that the input signal A1 is smaller than the output signal A2 and that the input signal B1 is larger than the output signal B2. In this instance a negative output signal appears at the output of the differential amplifier 6 whereby the trigger circuit 3 is actuated and a voltage is applied to the switch 7 whereby the latter closes to apply ground or zero potential to the input of the integrator circuit 5. Since the input value B1 differs from the output value B2 the trigger circuit 1 flips and applies a voltage to the input of the AND-gate 4. However, there is no signal present at the second input of the AND-gate at this time. Therefore, no voltage is supplied to the switch 8 through the conductor 19, whereby the switch 8 remains closed. The value A2 may now decrease to the value A1 in response to the time constant determined by the resistor 9 and the capacitor 10. The decrease follows a logarithmic characteristic. As soon as the value A2 reaches the value A1, the negative voltage at the output of the differential amplifier 6 disappears and the trigger circuit 3 returns into its rest condition whereby the control signal is removed from the switch 7 which is thereby opened. Prior to such opening of switch 7, the input of the integrator 5 was connected to ground potential so that the output voltage B2 remained constant. However, subsequent to the opening of the switch 7 a positive voltage is applied to the input of the integrator 5 through the amplifier 18 whereby the output voltage of the integrator 5 increases linearly and thus adjusts the output value B2 to the input value B1.

If the oscillating amplitude is to be made smaller than the previous oscillating amplitude, the oscillating amplitude is first adjusted to the smaller new value during which adjustment a variation of the value of the mean load is prevented by the application of ground potential to the input of the integrator 5.

EXAMPLE 4

It is assumed that the signal A1 is smaller than the signal A2 and that the signal B1 is also smaller than the signal B2. In this instance the operation of the circuit arrangement is the same as that described in connection with example 3. Since the mean load amplitude is to become smaller, negative voltage is applied to the input of the integrator 5 after the switch 7 has been opened. As a result, the output voltage of the integrator 5 and with it the output signal value B2 decrease until B2 is equal to B1.

Figure 2:
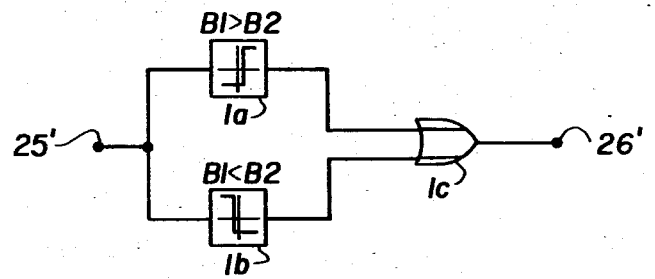

FIG. 2 illustrates two parallel trigger stages 1a and 1b having an input terminal 25' and connected with their outputs to an OR-gate 1c. The OR-gate has an output terminals 25 and 26 in FIG. 1 will be connected to the respective terminals 25' and 26' in FIG. 2. Trigger stage 1a responds to positive trigger signals whereas trigger stage 1b responds to negative trigger signals.

Although the invention has been described with reference to specific example embodiments, it is to be understood, that it is intended to cover all modifications and equivalents within the scope of the appended claims.

What is claimed is:

1. A signal transmittal control circuit arrangement comprising:
   a. a first input terminal for a first signal to be transmitted,
   b. a first output terminal for the first transmitted signal,
   c. first circuit means for connecting the first input terminal to the first output terminal to provide a first signal transmitting path between the first input terminal and the first output terminal,
   d. a second input terminal for a second signal to be transmitted,
   e. a second output terminal for the second transmitted signal,
   f. second circuit means for connecting the second input terminal to the second output terminal to provide a second signal transmitting path between the second input terminal and the second output terminal,
   g. switching means operatively connected with said first and second signal paths, and h. control means operatively connected to said switching means in said signal paths for blocking said signal paths in such a manner that in response to a decrease in the first signal the second signal path is blocked and that in response to an increase in the first signal the first signal path is blocked.

2. The circuit arrangement according to claim 1, wherein said switching means comprise a switching member arranged for interrupting the respective signal transmitting path in response to said control means.

3. The circuit arrangement according to claim 1, wherein said circuit means forming said signal transmitting paths comprise an amplifier means in at least one signal transmitting path, said switching means comprising a switching member connected to said amplifier means for blocking the respective signal path in response to said control means.

4. The circuit arrangement according to claim 3, wherein said switching member is connected between ground and an input of said amplifier means for grounding said amplifier input in response to said control means.

5. The circuit arrangement according to claim 3, wherein said amplifier means comprises an amplifier, an integrator circuit including a capacitor connected in parallel to the amplifier and a resistor connected to the input of the amplifier.

6. The circuit arrangement according to claim 1, wherein said switching means comprise a first controllable switch member arranged for cooperation with the first signal transmitting path, said first circuit means comprising signal function means connected between said first input and said first output terminals, said switching means further comprising a second controllable switch member arranged for cooperation with said second signal transmitting path, said control means comprising a differential amplifier having an output and first and second input means, said input means being connected across said signal function means, said control means further comprising first and second trigger circuit means having inputs connected to said output of said differential amplifier, said first trigger circuit means being responsive to a negative signal at said differential amplifier output and having a first trigger output connected for triggering said second controllable switch member, said second trigger circuit means being responsive to a positive signal at said differential amplifier output and having a second trigger output, said control means further comprising an AND-gate having an output and two inputs, and a third trigger circuit having an input connected to said second input terminal and an output connected to one input of said AND-gate the output of which is connected to said first controllable switch member, and means for connecting the second trigger output of said second trigger circuit to the other input of said AND-gate.

7. The circuit arrangement according to claim 6, wherein said third trigger circuit comprises two trigger stages connected in parallel having inputs connected to said second input terminal, and an OR-gate, said trigger stages being connected with their outputs to inputs of said OR-gate, said OR-gate having an output connected to said one input of said AND-gate, one of said two trigger stages being responsive to a positive signal and the other trigger stage being responsive to a negative signal.

8. The circuit arrangement according to claim 6, wherein said signal function means comprise a resistor connected between said first input terminal and said first output terminal thus across said first and second input means of the differential amplifier, and a capacitor connected between said first output terminal and ground.

9. The circuit arrangement according to claim 1, wherein said increase and decrease in said first signal is an increase and decrease in the amplitude of said first signal.

10. A signal transmittal control circuit arrangement comprising:
a. a first input terminal for a first signal to be transmitted,
b. a first output terminal for the first transmitted signal,
c. first circuit means for connecting the first input terminal to the first output terminal to provide a first signal transmitting path between the first input terminal and the first output terminal,
d. a second input terminal for a second signal to be transmitted,
e. a second output terminal for the second transmitted signal,
f. second circuit means for connecting the second input terminal to the second output terminal to provide a second signal transmitting path between the second input terminal and the second output terminal,
g. switching means operatively connected with said first and second signal paths, and
h. control means operatively connected to said switching means and comprising first means responsive to decreases in said first signal and independent of the amplitude of said second signal for blocking said second signal path, and second means responsive to increases in said first signal and independent of said second signal for blocking said first signal path.

* * * * *